Jan. 7, 1958 W. H. HAUPT 2,819,407
X-RAY APPARATUS
Filed July 9, 1954 7 Sheets-Sheet 1

INVENTOR.
WALTER H. HAUPT
BY
Marschal, Biebel, French & Bugg
ATTORNEYS

Jan. 7, 1958 W. H. HAUPT 2,819,407
X-RAY APPARATUS
Filed July 9, 1954 7 Sheets-Sheet 2
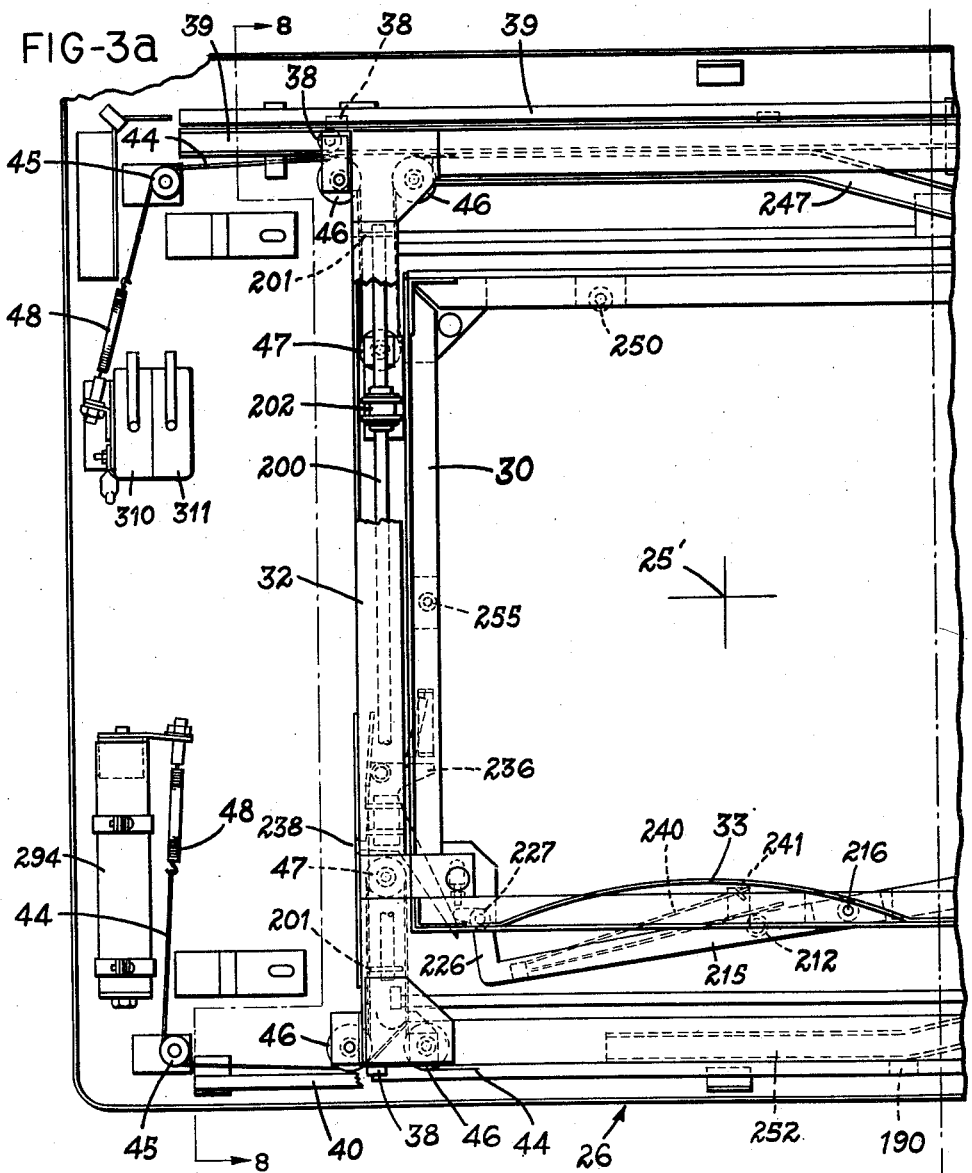
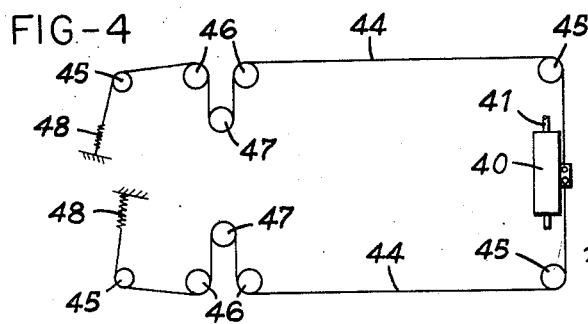
INVENTOR.
WALTER H. HAUPT
BY Marechal, Biebel, French & Bugg
ATTORNEYS

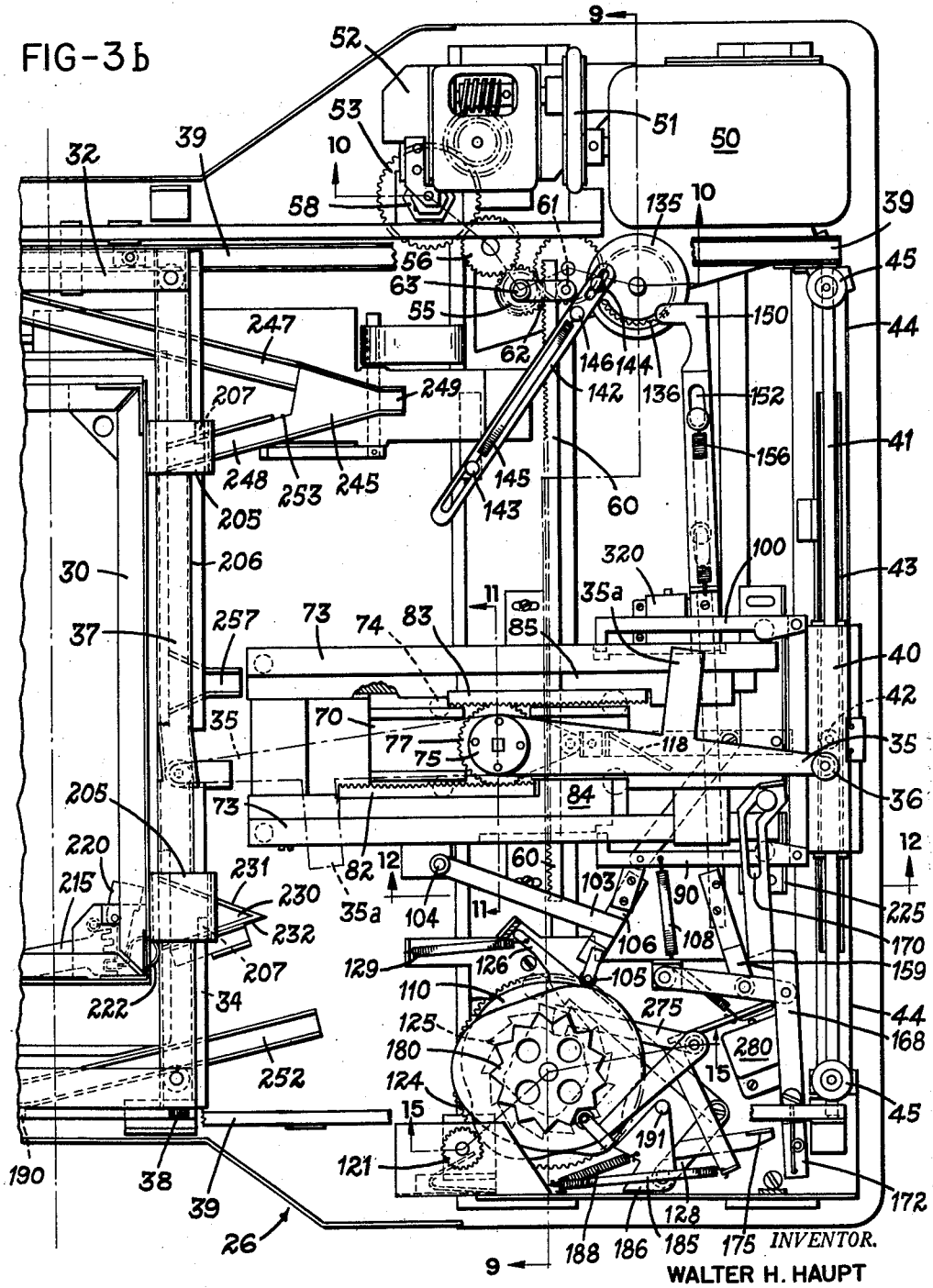

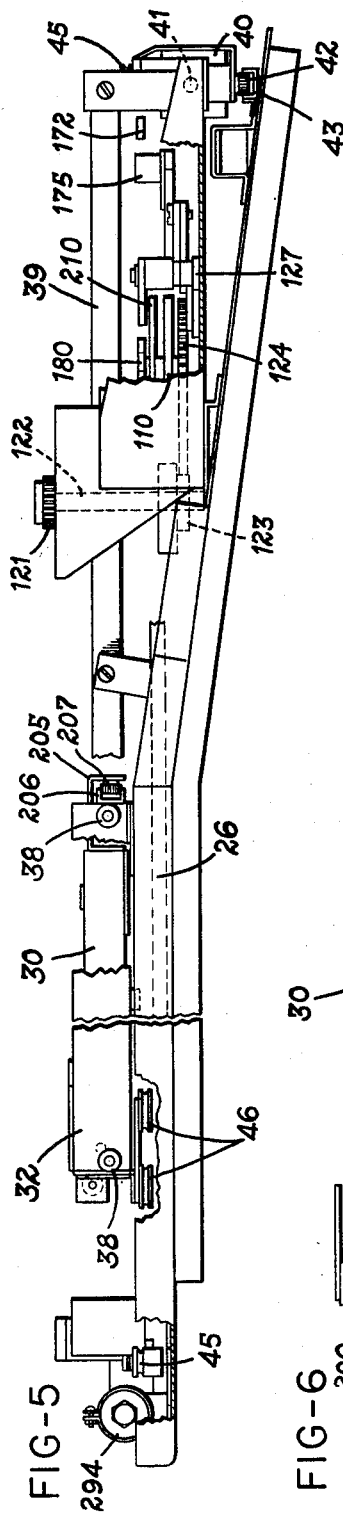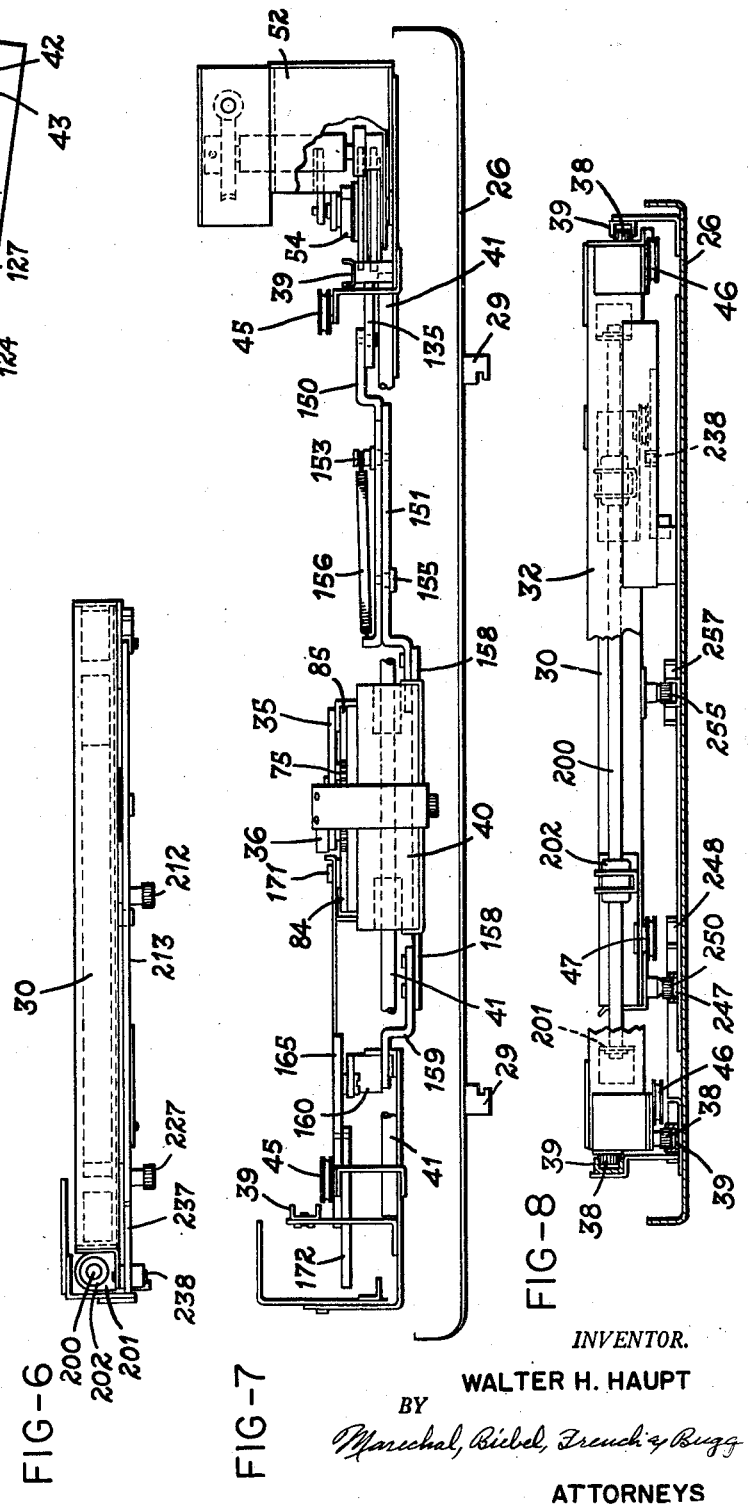

Jan. 7, 1958 W. H. HAUPT 2,819,407
X-RAY APPARATUS
Filed July 9, 1954 7 Sheets-Sheet 5
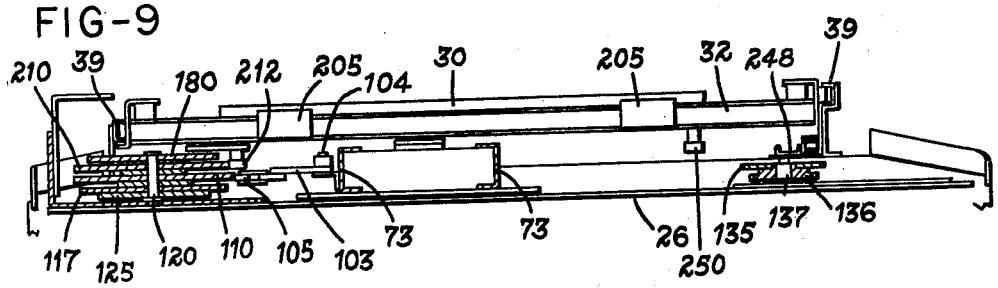
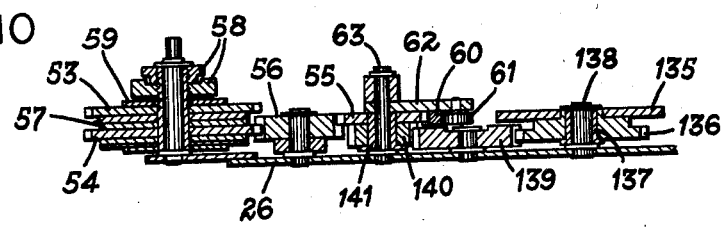
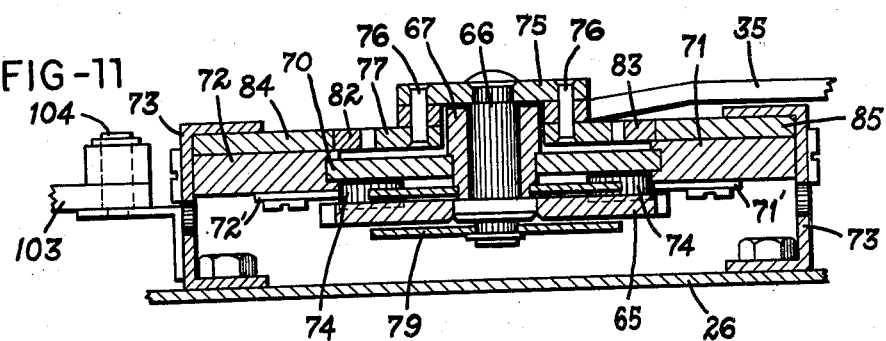
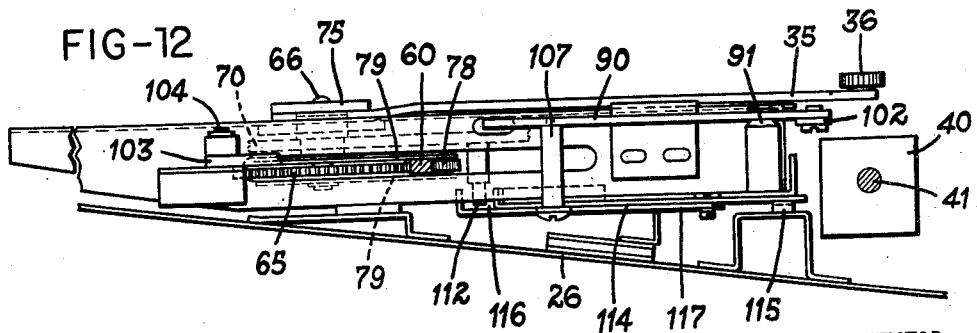
INVENTOR.
WALTER H. HAUPT
BY
ATTORNEYS

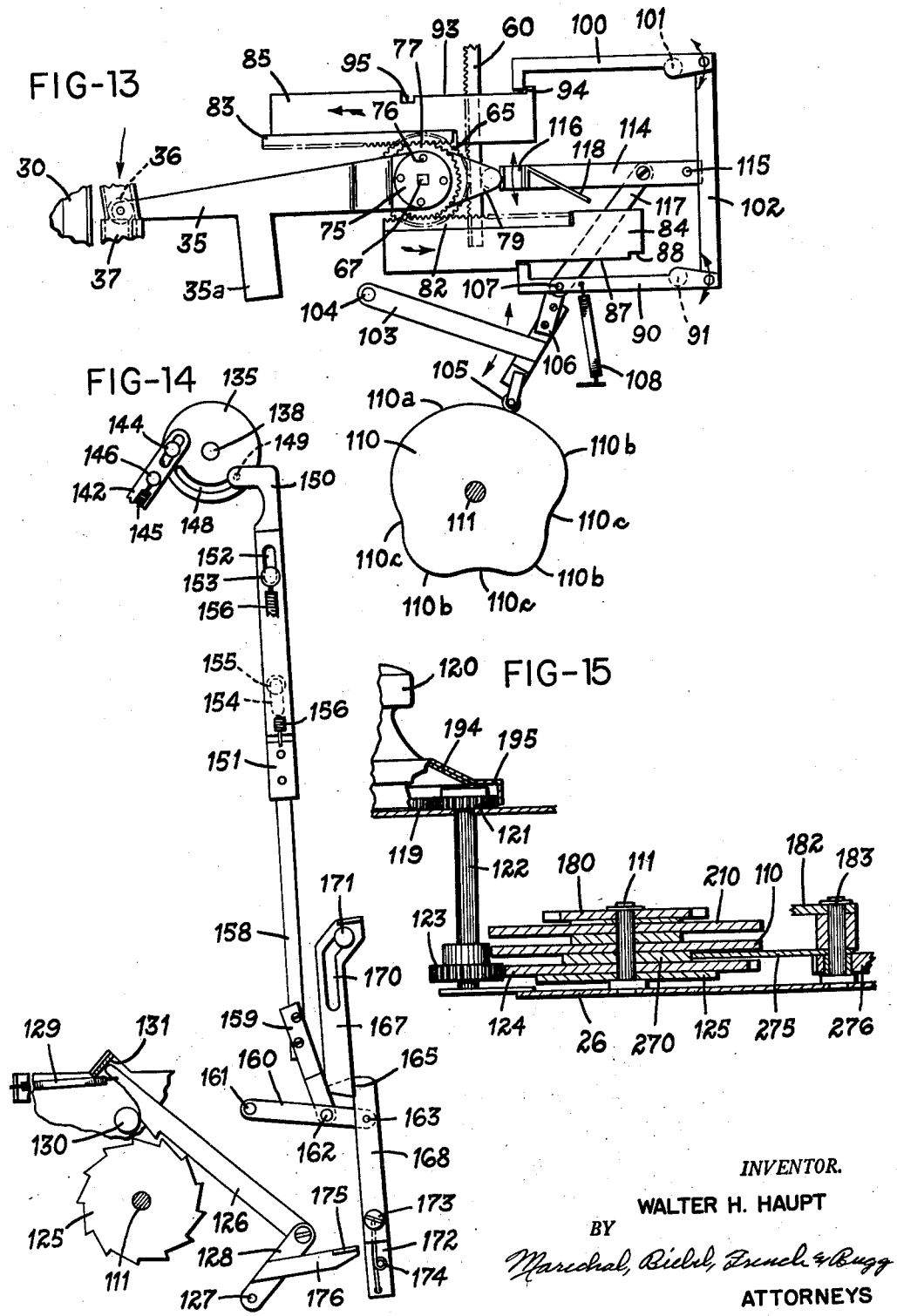

Jan. 7, 1958 W. H. HAUPT 2,819,407
X-RAY APPARATUS
Filed July 9, 1954 7 Sheets-Sheet 7

INVENTOR.
WALTER H. HAUPT
BY
Marechal, Biebel, French & Bugg
ATTORNEYS

United States Patent Office 2,819,407
Patented Jan. 7, 1958

2,819,407
X-RAY APPARATUS

Walter H. Haupt, Kenton Hills, Ky., assignor to The Keleket X-Ray Corporation, Covington, Ky., a corporation of Ohio Application July 9, 1954, Serial No. 442,338

16 Claims. (Cl. 250—66)

This invention relates to a spot film tunnel for X-ray examination purposes.

A spot film tunnel is a device to be employed in conjunction with a source of X-rays, usually contained in an X-ray examination table, which includes a fluorescent screen to be used for fluoroscopic examinations and also a carriage holding a cassette wherein there is contained X-ray sensitive film material. The carriage is mounted within the tunnel for movement between a retracted position out of the path of the X-ray beam and an advanced position in registry with the fluorescent screen. The doctor or operator is accordingly able to carry on fluoroscopic examination of the patient, and when he detects a condition which he wishes to radiograph, he causes the carriage to advance into its exposure position in registry with the fluorescent screen and takes the desired picture.

One of the principal objects of the present invention is to provide a spot film tunnel of improved construction in which movement of the carriage between its retracted and its advanced or exposure positions is effected by power operation in both directions under the control of the operator, and more particularly to provide a tunnel in which both advancing and retracting movements of the carriage are effected by a positive electric motor drive.

An additional object of the invention is to provide a spot film tunnel in which the mass of the cassette and the carriage therefor is smoothly accelerated and decelerated during movement of the carriage from retracted position to the exposure position without requiring elaborate or adjustable shock absorbing means such as dash pots and the like.

Another object of this invention is to provide a spot film tunnel in which the advancing movement of the carriage is carried out at a substantially greater speed than the retracting movement, thereby affording quick positioning of the cassette in the exposure position while retracting the exposed cassette at moderate speed to avoid jarring it as much as possible.

A further object of the invention is to provide a spot film tunnel having a control mechanism for the selective movements of the cassette which will eliminate to the maximum extent both the possibility of faulty operation, and also prevent damage to the mechanism in the event of faulty operation by the operator.

A still further object of the invention is to provide a spot film tunnel capable of taking a variety of sizes of X-ray exposures on a single sheet which at the same time has only a single retracted position for the cassette carriage facilitating loading of the carriage in the dark, and also to provide such tunnel wherein the retracted position of the carriage is centrally located with respect to the sides of the tunnel to establish distribution of shifting movements to either side of center.

It is also an object of the invention to provide a spot film tunnel wherein the cassette carriage and tray embody a simple and novel counterbalancing system assuring proper functioning of the tunnel both when in horizontal position and also when rotated with a tilting X-ray table throughout a full 90° in either direction about the long axis of the tunnel, as well as in intermediate rotated positions.

A further object of the invention is to provide a spot film tunnel as outlined above which is adapted for use with a cassette holding an X-ray film or plate, which is capable at the option of the operator of taking either four pictures each covering a quarter of the cassette, or two pictures each covering half of the cassette, or a single picture covering the entire cassette, wherein when the tunnel is utilized to take any plurality of pictures on one cassette, the carriage is automatically shifted between consecutive exposures to align the center of a non-exposed area of the cassette with the center of the fluorescent screen, and wherein the tunnel mechanism is automatically deactivated when an entire cassette has been exposed to prevent accidental double exposure.

Still another object of the invention is to provide a spot film tunnel as outlined above wherein all the parts are incorporated in a housing free of bulky projections on the bottom thereof such as might interfere with the patient or with free access of the patient on the part of the physician, and also free of bulky projections on top such as might prevent shifting of the tunnel as a whole close to its supporting tower or the table top.

Other objects and advantages of the invention will be apparent from the following description, the accompanying drawings and the appended claims.

In the drawing—

Figure 1:
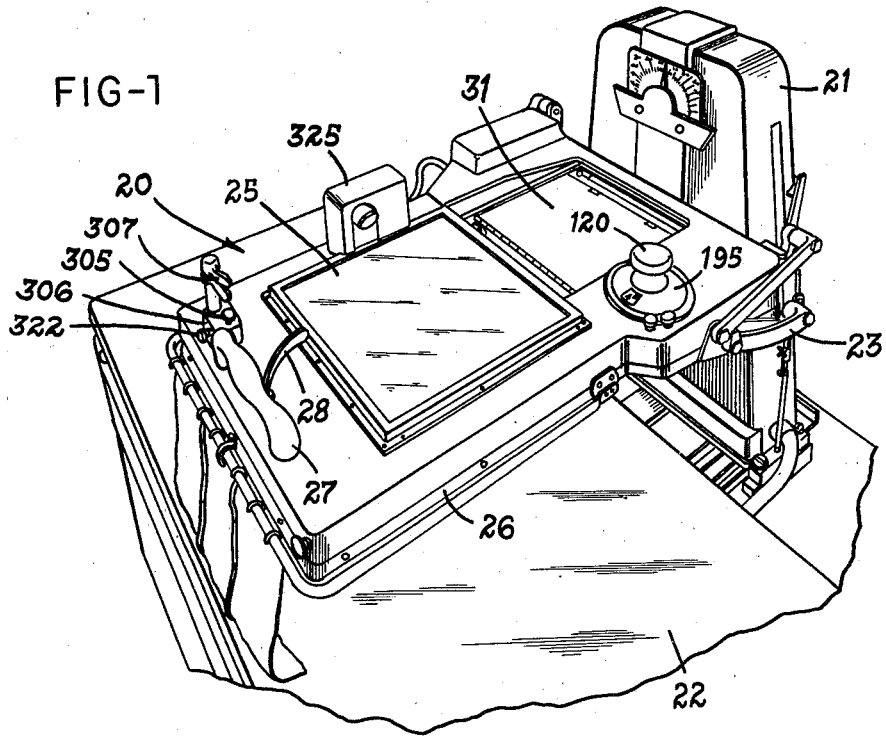
Fig. 1 is a perspective view of an X-ray spot film tunnel constructed in accordance with the invention.
Figure 16:
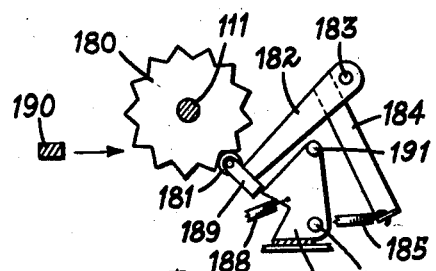
Figure 17:
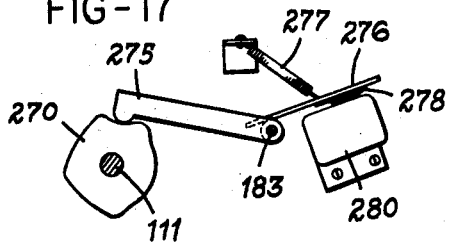
Figure 18:
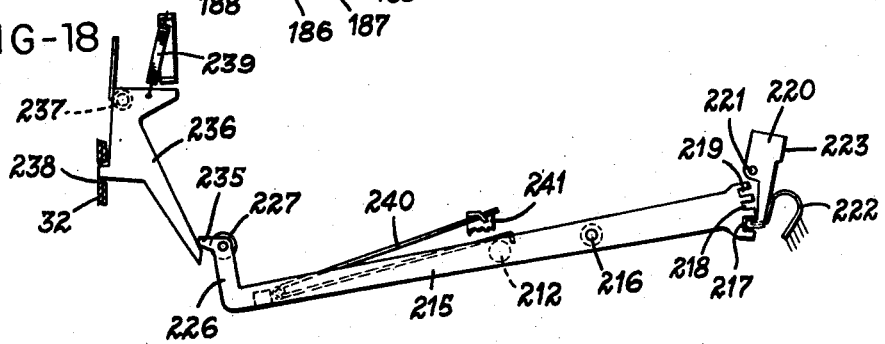
Figure 21:
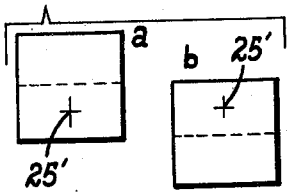
Figure 22:
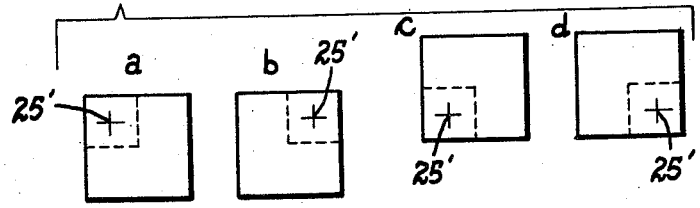
Figure 23:
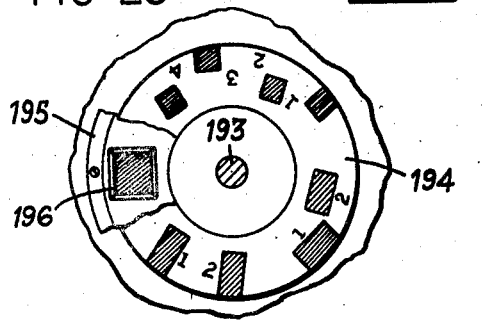

Figs. 3a and 3b together constitute a plan view of the X-ray spot film tunnel shown in Fig. 1 with the cover removed and the associated carriage advanced to the left to uncover the operating mechanism, and with that mechanism shown in the retracted position;

Fig. 4 is a schematic diagram of the cassette tray counterbalancing mechanism partially shown in Figs. 3a and 3b;

Fig. 5 is a broken side view partly in section and partly in elevation of the tunnel of Figs. 1–4;

Fig. 6 is a side view of the cassette tray removed from its carriage;

Fig. 7 is an end view looking from right to left in Fig. 3b with a portion of the tunnel base removed;

Fig. 8 is a section taken along line 8—8 of Fig. 3a with a portion of the carriage wall broken out;

Fig. 9 is a section taken along line 9—9 of Fig. 3b;

Fig. 10 is a partial section taken along line 10—10 of Fig. 3b;

Fig. 11 is an enlarged partial section taken along line 11—11 of Fig. 3b;

Fig. 12 is a partial section taken along line 12—12 of Fig. 3b;

Fig. 13 is a fragmentary simplified view of the carriage control mechanism in Fig. 3b;

Fig. 14 is a similar view of the indexing control mechanism in Fig. 3b;

Fig. 15 is a partial section along line 15—15 of Fig. 3b, including the manual control knob shown in Fig. 1;

Fig. 16 is a fragmentary view of the index positioning means in Fig. 3b;

Fig. 17 is a similar view of the control mechanism for preventing double exposure of the X-ray film;

Fig. 18 is a similar view of the mechanism for positioning the cassette tray in accordance with the present invention;

Figs. 19 to 22 are schematic representations of the various positions of the cassette relative to an X-ray tube that may be provided by the operating mechanism of this invention; and Fig. 23 is a detail view, partly in section and partly in elevation, of the indicator dial seen in Fig. 1.

Referring to the drawings, which illustrate the preferred embodiments of the invention, Fig. 1 shows an X-ray film tunnel 20 mounted on the tower 21 of a tilting X-ray table 22 by a supporting mechanism 23 of the type illustrated in my Patent No. 2,653,245 issued September 22, 1953, to the assignee of this application. The tunnel 20 is shown as including a fluorescent screen 25 and tunnel base 26, and a handle 27 facilitates adjustment of the tunnel and tower with respect to the X-ray table 22. The part 28 in Fig. 1 represents a control handle for the tilting movement of the table 22, and the bottom of the tunnel is provided with guideways 29 (Fig. 7) for the usual compression cone masks.

At the back of the tunnel 20 is an access opening to the cassette tray 30 by which a cassette 31 in inserted for use and removed after exposure. The cassette tray 30 is mounted for movement transversely of the tunnel in a carriage 32, the tray being provided with a spring 33 for holding the cassette therein. The carriage 32 is movable lengthwise of the tunnel between a retracted or rest position at the back of the tunnel and a plurality of advanced or exposure positions in line with the fluorescent screen 25, and the center of this screen is indicated at 25' as aligned with the center of the X-ray beam from the tube within the table 22. This movement of the carriage 32 is effected by a control or delivery arm 35 which is connected with the carriage by means of a roller 36 riding in a track 37 extending along the back side of the carriage. The support for the longitudinal movements of the carriage in the tunnel is provided by a plurality of rollers 38 riding in channeled tracks 39 extending along the sides of the tunnel base 26.

The cassette tray 30 is provided with a counterbalancing system for its movements in the carriage 32, this being especially desirable when the tunnel is used with the table in a tilted position, since in such case the movements of the cassette tray may have a substantial vertical component. Referring especially to Fig. 4, a weight 40 is mounted for sliding movement on a rod 41 at the rearward end of the tunnel and is guided by a roller 42 against rotational movement in a channeled track 43 on the base. Suitable cords or wires 44 are attached at one end to weight 40, threaded around stationary pulleys 45 which are mounted near the four corners of the tunnel base 26, around pulleys 46 which are mounted on carriage 32, and around pulleys 47 which are mounted on tray 30, and these cords are attached at their ends to springs 48 anchored at the forward end of the tunnel. If weight 40 weighs a fraction of the weight of tray 30 with a cassette inserted therein, for example one-half, it can be allowed to travel twice the distance of the traversing movement of the tray, and this arrangement permits a smaller weight to be used and thus occupies less space inside the tunnel.

Figure 19:
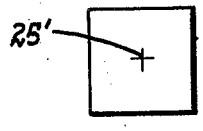
Figure 20:
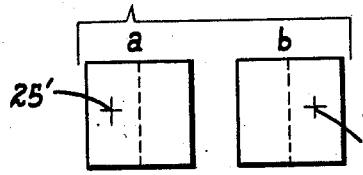

The cassette tray 30 and carriage 32 are movable selectively in the tunnel to a plurality of different positions such that the entire film is exposed in a single radiograph as shown in Fig. 19, each half of the film is exposed separately with such half running either longitudinally or laterally of the tunnel as indicated in Figs. 20 and 21, or the four quarters of the film are exposed successively as indicated in Fig. 22. For each such selected exposure area, the movements of the carriage and tray are such that the exposed area is centered with respect to the beam as indicated at 25' in Figs. 19–22. All such movements of the carriage and tray originate with the control arm 35 through the main drive of the tunnel as now described.

Drive system

The movements of the carriage 32 in both directions lengthwise of the tunnel are powered by a reversible electric motor 50 mounted at the back corner of the tunnel base 26 as shown in Fig. 3b. The motor 50 connects through a belt drive 51 to a gear box 52. Referring to Fig. 10, the output of this gear box is connected through gears 53 and 54 to a pinion 55 through an idler gear 56, the gears 53 and 54 being frictionally connected through friction elements 57 and suitable adjusting nuts 58 acting on a flat spring 59 to provide friction between elements 57 to form a friction clutch between gears 53 and 54. The pinion 55 drives a rack 60 which extends crosswise of the tunnel base and is held in mesh with the pinion by a roller 61 carried by an arm 62 on the supporting shaft 63 for pinion 55.

The rack 60 also engages and drives a gear 65 which is in turn connected with and causes pivoting movement of the control arm 35 for the movements of the cassette tray 30 and carriage 32. Referring particularly to Figs. 11–13, the gear 65 is fixed on a shaft 66 supported in a bushing 67 which is secured in a slide 70. A pair of oppositely disposed parallel guides 71 and 72 are mounted on the tunnel base 26 by means of brackets 73 and are grooved along their adjacent edges to receive the outer edges of the slide 70. A plurality of rollers 74 depend from the slide 70 and engage hardened steel ways 71' and 72' fastened to the underside of guides 71 and 72 respectively to facilitate movement of slide 70 lengthwise of the tunnel.

The upper end of the shaft 66 is secured, as by a square portion, to a disk 75 which is in turn secured by rivets 76 to the hub portion of the control arm 35 and also to a gear 77. The rack 60 is held in driving engagement with the gear 65 by means of a roller 78 carried by a pair of arms 79 pivoted on the shaft 66 and bushing 67 respectively. The gear 77 engages a pair of rack inserts 82 and 83 which are rigidly attached to rack slides 84 and 85. These rack slides are in turn supported for limited movement longitudinally of the tunnel in a plane parallel to but above the slide 70, and means are provided for selectively holding or locking one or the other of rack slides 84 and 85 against such sliding movement.

Referring particularly to Fig. 13, the back edge of the rack slide 84 is relieved at 87 along a portion extending from approximately the middle of the slide to its rearward end, and at the corner end of this relieved portion 87 is a notch 88 for receiving a locking pawl 90 mounted on a fixed pivot 91. The back edge of the rack slide 85 is similarly relieved at 93, and this relieved portion 93 terminates at its rearward end in a shoulder 94 and at its forward end in a notch 95 for receiving a locking pawl 100 mounted on a fixed pivot 101. The pawls 90 and 100 are in turn connected for conjoint movement by a link 102 as shown in Fig. 13.

The pawls 90 and 100 are operable selectively to lock one or the other of the rack slides 84 and 85 against movement or to release both of these slides, and this in turn controls the movements of the control arm 35 and its supporting slide 70. More specifically, Fig. 3b shows the arm 35 in full lines in its rest position where the carriage 32 would normally be retracted to the back of the tunnel, and the driving movement of rack 60 to advance the carriage is upward in Fig. 3b, causing rotation of gears 65 and 77 in counterclockwise direction. If the rack slide 84 is locked, then gear 77 will travel along rack 82, carrying rack 83 and slide 85 with it, and thus slide 70 will move forward in the tunnel during the pivoting movement of arm 35, with the result that carriage 32 will travel to its furthest advanced position corresponding to Fig. 20b or Figs. 22b and 22d.

If in Fig. 3b the rack slide 85 is locked and slide 84 is free, then the reverse action will occur. Gear 77 will travel along rack 83 carrying rack 82 with it, and slide 70 will accordingly move rearwardly in the tunnel while arm 35 pivots in it, with the result that carriage 32 will travel to its nearest advanced position corresponding to Figs. 20a, 22a and 22c. If in Fig. 3b both rack slides are unlocked, then they will track as gear 77 rotates, with the result that slide 70 will tend to remain stationary while arm 35 pivots. This will therefore cause carriage 32 to travel to its intermediate advanced position corresponding to Figs. 19 and 21, and shown in dotted lines in Fig. 3b. In other words, the effective delivery stroke of the arm 35 with respect to carriage 32 may be equal to approximately twice the length of the arm, when both rack slides are free to move, or may be augmented or diminished by the extent of movement of the slide 70 when one or the other rack slide is locked. In all these movements, the arm 35 is supported against sagging by its extension portion 35a which rides on top of the slides 84 and 85 and their associated structure.

Means are provided for selectively locking either of the rack slides 84 and 85 and also for holding slide 70 stationary when both rack slides are unlocked. Referring to Fig. 13, a pivot arm 103 is mounted for pivotal movement at one end on a fixed pivot 104 on the tunnel base 26. An arm 106 secured to the free end of pivot arm 103 carries a roller type cam follower 105 at one end while its other end supports the pressure of a pin 107 by which it is pivoted to the pawl 90, and this pawl and pin are urged away from the slide 84, downwardly as viewed in Fig. 13, by a spring 108 fixed to the base.

A cam 110 cooperates with the follower 105 and the spring 108 to control the pawls 90 and 100, this cam being fixed on a shaft 111 carried by the tunnel base 26. As shown in Fig. 13, the cam 110 includes an extended arcuate portion 110a which is centered on shaft 111 and is of such radius as to operate through follower 105 and link 103 to hold both of the pawls in their unlocked positions. In addition, the cam includes three high points 110b which act through follower 105 to push pawl 90 against spring 108 into locking engagement with notch 88 on slide 84 and at the same time to hold pawl 100 in its unlocked position. Similarly cam 110 includes three low points 110c which cooperate with follower 105 to permit spring 108 to pull pawl 90 away from slide 84 and thus to draw pawl 100 towards locked engagement with the notch 95 in slide 85.

As stated, when the cam 110 is set to unlock both of pawls 90 and 100 as shown in Fig. 13, both rack slides 84 and 85 are free to move, and slide 70 would therefore tend to remain stationary as gear 77 moves both these slides 84 and 85. However, due to the inertia of the carriage 32 resisting the delivery stroke of arm 35, the slide 70 would tend to move away from the carriage 32 during the early part of the delivery stroke, and most of the work of moving the carriage would have to be done at the end of the stroke. To prevent this result, a pin 112 depends from the bottom of slide 70 as shown in Fig. 12. An arm 114 is mounted for pivotal movement at one end 115 and has a U-slot 116 formed at its other end which receives the lower end of pin 112. A link 117 extends between arm 103 and arm 114 to transmit the same movement to arm 114 as is given to pawls 90 and 100. Thus, when both these pawls are unlocked, pin 112 engages in slot 116 and holds slide 70 stationary, but when either pawl 90 or 100 is in locking position, the arm 114 is moved out of the path of pin 112, and slide 70 is free to move lengthwise of the tunnel. A diagonally arranged fin or wing 118 on the arm 114 acts as a safety cam during the return movement of the carriage from its nearest advanced position to prevent possible hanging up of the pin 112 on the back side of the slot 116.

*Indexing mechanism*

As pointed out, the carriage 32 and cassette tray 30 are movable selectively to a plurality of advanced positions which are indicated diagrammatically in Figs. 19-22. There is accordingly a total of nine different possible exposure positions for the cassette with respect to the center 25' of the fluorescent screen and the X-ray beam. These positions are determined partly by the stroke of the carriage 32 in accordance with the movements of the control arm 35, and partly by the movements of the cassette tray 30 laterally of the tunnel in the carriage 32. Means are provided for selectively indexing these parts in accordance with the desired size of the exposure area and its arrangement on the film.

The stroke of the carriage 32 and control arm 35 is determined as described by means of the cam 110. This cam may be indexed manually by means of the control knob 120 which is mounted on top of the tunnel. This control knob drives a gear 119 (Fig. 15) meshing with a pinion 121 on the upper end of a shaft 122, and the lower end of this shaft carries a pinion 123 meshing with a gear 124 on the cam shaft 111. This cam shaft also carries a ratchet wheel 125 which determines the indexed position of the cam shaft.

Referring to Fig. 14, the ratchet wheel 125 is provided with a total of thirteen teeth cooperating with a pawl 126, these teeth corresponding to the nine different positions of the cassette in Figs. 19-22 plus four additional positions respectively intermediate the settings for each sequence of exposures, these latter settings being locked positions wherein no movement of the carriage can take place and being provided to prevent the possibility of double exposure of the film. The pawl 126 is linked to an arm 128 pivoted on a fixed stud 127, and it is provided with a return spring 129. This spring retracts the pawl after each stroke to a position in engagement with stops 130 and 131 wherein the pawl is out of engagement with ratchet 125 for free rotation of shaft 111 in either direction if desired. The pawl 126 is moved against spring 129 to advance the ratchet wheel 125 and shaft 111 by an indexing linkage shown in detail in Fig. 14 which is driven from the motor 50.

Referring to Fig. 10, a slotted wheel 135 is mounted on the hub of a gear 136 which is in turn mounted by a sleeve 137 on a fixed shaft 138. The gear 136 is driven through an idler 139 by a pinion 140 secured to the same bushion 141 which supports the pinion 55 on the shaft 63. The gearing is such that the wheel 135 moves through approximately ¾ of a complete revolution during the stroke of the control arm 35, and means are provided for spring loading this wheel as it approaches its advanced position to cushion the associated parts. Referring to Fig. 3b, a strap 142 is slotted at both ends to receive a fixed mounting pin 143 and a mounting pin 144 carried by wheel 135. A tension spring 145 is connected to the mounting pin 143 and to a pin 146 carried by strap 142 to provide a generally downward biasing force on the strap as viewed in Fig. 3b. It will be seen that as the wheel 135 approaches its limit position approximately ¾ of a revolution in a counterclockwise direction away from the position shown in Fig. 3b, the strap 142 will be pulled against spring 145 to provide the desired spring cushioning effect.

As shown in Fig. 14, the wheel 135 is provided with an arcuate slot 148 which receives a pin follower 149 carried by a reciprocating arm 150. The slot 148 is centered on shaft 138 so that the pin 149 and arm 150 are actuated during only a portion of the rotational movement of wheel 135. The arm 150 is slidably fastened to another arm 151 by means of a slot 152 in arm 150 which receives a cooperating pin 153 on arm 151 and a similar slot 154 in arm 151 which receives a cooperating pin 155 on arm 150. A tension spring 156 is connected between the upturned end of arm 150 and the pin 153 to urge the arms 150 and 151 longitudinally apart and to provide means for storing indexing energy when movement of arm 151 is blocked.

Movement of arm 151 is transmitted through an extension strap 158 and connecting arm 159 to a lever 160 which is mounted for free pivotal movement about a stud 161, and which is pivoted at 162 to arm 159. Lever 160 is also pivotally attached at 163 to a striking lever 165, which includes a guided portion 167 and a striking portion 168. The guided portion 167 has formed therein a cam slot 170 for following a fixed pin 171 as the lever 165 is moved by lever 160, and striking portion 168 includes a floating bar 172, pivoted at 173 to link 165, and urged into alignment with that link by a spring 174. Floating bar 172 is designed to engage an upturned portion 175 on a bar 176 extending from lever 128, and through this lever to actuate pawl 126.

This operation of the indexing mechanism and the pawl 126 is coordinated with the movements of the carriage 32 and also is in part controlled by a star wheel 180 secured on the upper end of the cam shaft 111. Referring especially to Fig. 16, this star wheel has thirteen indentations formed about its periphery, and each corresponding to one tooth on ratchet wheel 125. The star wheel 180 is provided with a detent comprising a roller follower 181 on a lever 182 pivoted on a fixed stud 183. An extension arm 184 on the lever 182 is connected with a biasing spring 185. Means are also provided for cooperation with the detent mechanism to lock the star wheel 180 to prevent rotation of cam shaft 111 at any time except when the carriage 32 is in fully retracted position. This locking mechanism comprises a pawl 186 pivoted on a fixed stud 187 and provided with a biasing spring urging it to a position in which it abuts an extension 189 on lever 182 to prevent withdrawal of the roller 181 from engagement with the star wheel. Release of the locking pawl 186 is effected by a stop 190 on carriage 132 which engages an upwardly projecting pin 191 on the pawl 186 as the carriage completes its return movement to fully retracted position.

The operation of the indexing mechanism begins when the carriage 32 moves toward an advanced position, since the slotted wheel 135 is rotated at the same time as pinion 55. Arms 150, 151 and 158 are pulled upwardly from the position of Fig. 14, lever 160 swings about stud 161, and the striking lever 165 is pulled up and clockwise about pin 171 until the floating bar 172 breaks against, and slides over, the upturned portion 175 of arm 176 against the resistance of spring 174. As the carriage 32 begins its return stroke, the rotation of slotted wheel 135 is reversed, and bar 172 pushes arm 176 downwardly about stud 127 until pawl 126 engages ratchet wheel 125. The carriage is still away from its retracted position, so star wheel 180 and shaft 120 are locked against rotation by pawl 186. The indexing linkage is accordingly stopped, but slotted wheel 135 continues to turn, and arm 145 continues to move downwardly, now against the resistance of spring 156, so that indexing energy is stored in that spring. When carriage 32 has almost completed its retracting movement, stop 190 unlocks pawl 186 and the indexing linkage is freed. Spring 156 then immediately acts to force arm 151 and lever 165 downwardly, and bar 172 at the same time causes pawl 126 to advance ratchet wheel 125, thus rotating the shaft 111 to the next position in the desired sequence with a quick, snappy action.

Fig. 23 shows the selector dial which affords to the operator a visual means of determining the exact position of star wheel 180. The dial mechanism includes a stub shaft 193 which carries knob 120 and selecting gear 119, a dial member 194 which is fastened to shaft 193 to rotate with knob 120, and a cover plate 195 which is fixed to the top of the tunnel and is provided with a window 196 for viewing the various markings on dial member 194. Most of the cover plate 195 is broken away in Fig. 23 to expose the markings on the dial member, but the complete cover plate will be seen in Fig. 1, with window 196 exposing one of the markings as in actual use.

As the operator manipulates the knob 120, shaft 111 is rotated to position the various cams carried thereon, and a particular marking on dial member 194 will appear beneath window 196 corresponding to the particular setting of the cams. For example, in Fig. 23 the shaded marking on the dial member completely fills the window, indicating that the tunnel mechanism is set to center the cassette beneath the screen 25 for exposing the complete film, as in the diagrammatic example of Fig. 19. Following in counterclockwise order about dial member 194 are the markings corresponding to the various settings of the cams which result in the sequences schematically shown in Figs. 20, 21 and 22 respectively. It will be noted that blank spaces appear on the dial member between each sequence, and when these spaces appear beneath window 196, the operator knows that the entire film in the cassette has been exposed.

*Cassette tray control*

As previously noted, the cassette tray 30 is movable transversely of the tunnel in the carriage 32. The forward side of tray 30 is supported by a rod 200 mounted on the carriage by a pair of brackets 201. Sliding bushings 202 are attached to the tray 30 for movement along rod 200. The rearward side of the tray is provided with a pair of brackets 205 which overhang a channeled track 206 (Fig. 5) on the rearward side of carriage 32, and these brackets carry rollers 207 running in this track.

A cam 210 is fixed on the cam shaft 111 to coordinate the movements of tray 30 with the settings of cam 110 and star wheel 180. Referring particularly to Figs. 3a and 18, this cam 210 operates only when the carriage is in fully retracted position, in which position it engages a roller follower 212 depending from an arm 215 which is pivotally mounted at 216 on the bottom of tray 30. The arm 215 is provided at its rearward end with three notches 217, 218 and 219 for selectively receiving a latch 220, which is pivotally mounted at 221 on tray 30 and is urged toward engagement with one of these notches by a spring 222 on the tray. A projection 223 on latch 220 is arranged to strike a fixed stop 225 (Fig. 3b) when carriage 32 is in the retracted position for unlocking arm 215 and enabling cam 210 to set the follower 212.

The guiding portion 226 of arm 215 carries a roller 227 which is adapted to engage a V-shaped guide member 230 fixed to the tunnel base 26 as the carriage 32 moves toward its advanced positions. Thus when the carriage is retracted and latch 220 is free, cam 210 will position arm 215 in such manner that as the carriage is advanced the latch will move into a selected notch 217, 218 or 219. If slot 219 is chosen, for example, roller 227 will engage guide member 230 and pass along its upper side 231, but if slot 218 is engaged by latch 220, roller 227 will pass along the lower side 232 of the guide member 230. When the lowest slot 217 is engaged by the latch, roller 227 passes completely beneath and does not touch guide member 230 as the carriage advances.

In this last position the tray is locked to the carriage by an engagement of a finger extension 235 on arm portion 226 with a tray lock member 236. The lock member is pivoted on the bottom of the tray about stud 237, and it locks in a slot 238 in the side of carriage 32. A spring 239 biases lock member 236 out of its locked position except when it is operated by finger 235. Whenever the latch 220 is out of engagement with arm 215, the arm is biased in clockwise direction by a hairpin spring 240 held between arm 215 and a bracket 241 on the tray 30, thus assuring engagement of follower 212 with cam 210 when the carriage is in its rest position.

Guide member 230 terminates short of the advanced positions of the carriage to avoid extending below screen 25. For continued guiding of the tray 30, there is provided an upper guideway 245 (Fig. 3b) of generally Y-shape which includes an extended upper portion 247, a short lower portion 248 and a rear portion 249. When the carriage 32 is retracted, a roller 250 (Fig. 3a) carried by the upper edge of tray 30 is in the rear portion 249 of guideway 245. As the carriage advances, the roller 250 enters either lower portion 248 or upper portion 247 of guideway 245, according to the action of guide 230 on the cassette tray roller 227 as described.

When the roller 250 is guided into portion 247 of guideway 245, it pulls the tray 30 across carriage 32 to an upper position, but if the roller 250 enters lower portion 248, additional guiding must be provided, since this portion 248 terminates short of the advanced carriage position for the same reason as guide member 230. To afford this additional guiding, a lower guideway 252 is arranged at the other side of tunnel 26 to receive follower 212 when roller 250 enters the lower portion 248, and thus to pull the tray 30 into a lower position as the carriage 32 advances. When the tray is locked in the carriage, by the part 236 as described, it moves in a straight line with the carriage to one of the positions represented in Figs. 19, 20a and 20b, and the guideway 245 is accordingly relieved at 253 to permit the roller 250 to move between the upper and lower portions 247 and 248 of the guideway.

Whenever the carriage 32 is retracted, a roller 255 mounted at the forward edge of the tray 30 enters a short centering member 257 as the follower 212 or roller 250 leaves its associated guideway 247 or 252. This operates to hold tray 30 in the exact center of carriage 32 while it is in the retracted position, thus properly aligning follower 212 with cam 210, under the biasing force of spring 240. This centering action by the roller 255 is also supplemented by the action of the roller 250 in the rearward portion 249 of guideway 245.

In summary, it will be seen from the above description that the carriage control mechanism provides three separate advanced positions for carriage 32, by comparing Figs. 19 and 21, and the tray control affords three separate positions of tray 30 relative to the carriage, as seen by comparing Figs. 19 and 20, with nine separate settings resulting from combinations of these positions. At the end of each sequence, in other words, at the end of the combinations of Figs. 19, 20, 21 and 22, the X-ray sensitive material in cassette 28 will be entirely exposed. In order, therefore, to prevent possible double exposure, the cam shaft 111 carries a motor control cam 270 which actuates a follower lever 275 pivoted on the stud 183. The lever 275 carries an arm 276 and is moved by cam 270 against the resistance of a spring 277, and the arm 276 in turn carries a spring member 278 for operating a motor control switch 280 to interrupt the control circuit for motor 50 whenever such a full exposure has been completed, thus eliminating the possibility of inadvertent double exposures.

Electrical circuit

Figure 2:
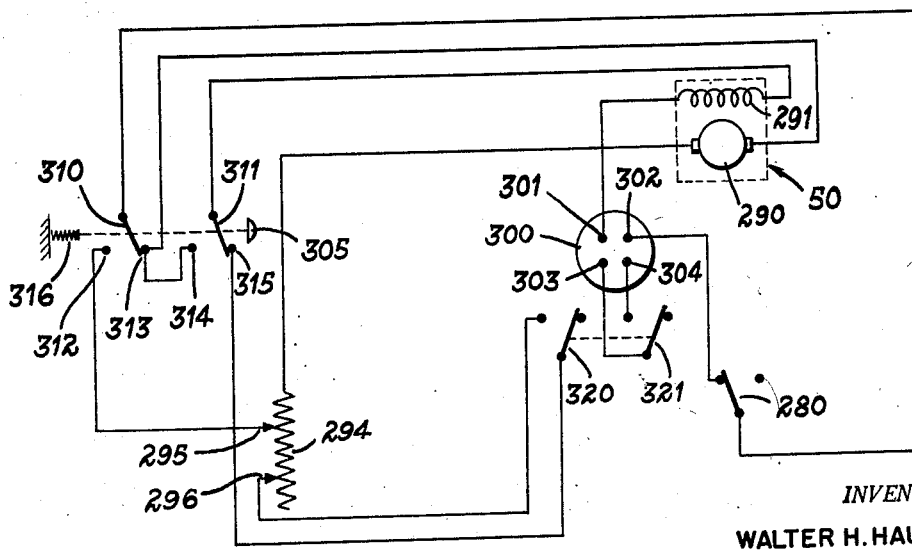
Fig. 2 is a schematic wiring diagram of the electrical control for the tunnel of Fig. 1.

Fig. 2 shows schematically the electrical circuit for controlling motor 50, which motor is shown as having an armature 290 and field coil 291. A rheostat 294, having a high speed contact 295 and a low speed contact 296, is provided for controlling the speed of motor 50 during advancing and retracting movements of carriage 32. These contacts are each variable along the rheostat to allow adjustment of the advancing and retracting speeds. Electrical energy from a suitable source is shown as supplied by a four pole plug or receptacle 300 having poles 301–304.

The main control member for initiating movement of the carriage 32 is shown in Fig. 1 as a push button 305 mounted in the supporting bracket 306 for the shutter control levers 307. This push button 305 operates a pair of single pole double throw switches 310 and 311, the switch 310 having contacts 312 and 313, and the switch 311 having contacts 314 and 315. These switches are normally biased to the positions shown in Fig. 2, as indicated diagrammatically by a spring 316. Two additional switches 320 and 321, which are normally closed, are mounted at the back of the tunnel in such manner as to be held open by a suitable member (not shown) on carriage 32 when the carriage is fully retracted, the switch 320 being a reversing switch as described hereinafter, and the switch 321 being the usual changeover switch for changing circuits to the X-ray tube from fluoroscopic to radiographic intensity in timed relation with the movements of the carriage 32 between its retracted and exposure positions.

In operation, depression of push buttons 305 completes the starting circuit for the motor 50 to advance the carriage 32. This advancing circuit runs from pole 301 through the motor field 291, switch arm 311, switch contacts 314 and 313, motor armature 290, resistor contact 295, switch contact 312, switch arm 310, switch 280 and pole 302. As soon as the carriage leaves its retracted position, the switches 320 and 321 close, causing the proper tube filament circuit to be completed for raising the tube intensity to the proper radiographic level.

The carriage advances to the proper exposure position determined by the setting of pawls 90 and 100 as described, and when the delivery stroke of the arm 35 is completed, the continued rotation of motor 50 will result in slipping of the friction drive through the friction element 57. While the carriage is in its exposure position, the radiograph is made by any suitable control means such as the usual foot switch, or a push button switch such as indicated at 322 in Fig. 1. Timing of the exposure may be by the usual photoelectric timing system, and a pickup unit for this purpose in indicated at 325 in Fig. 1, reference being made in this connection to the copending application of Robert Lee, Serial No. 437,408, (Docket 3027), filed June 17, 1954, and assigned to the same assignee as this application.

The operator holds push button 305 depressed throughout the exposure, and as soon as the exposure is completed, this push button is released to initiate return movement of carriage 32. Release of the push button causes the switch arms 310 and 311 to return to their positions shown in Fig. 2, but the switch 320 will remain in its closed position. This will therefore complete the reversing circuit for motor 50, which runs from pole 301 through field 291, switch arm 311, switch contact 315, reversing switch 320, rheostat contact 296, motor armature 290, switch contact 313, switch arm 310, switch 280 and pole 302. The return movement of the carriage will accordingly be at a slower speed than its advance, by reason of the increased resistance of rheostat 294, and as the carriage 32 reaches its fully retracted position, it again engages and opens switch 320 to break the motor circuit.

As an example of a particular sequence of operation of this invention, consider the situation where the operator wishes to make four radiographs each occupying only one-quarter of the area of the film in cassette 31. Assuming that a fresh cassette has been placed in tray 30, the operator first turns selector knob 120 until the small square marked with accompanying numeral "1" on dial member 194 appears beneath window 196, signifying that the first of four quarters of the cassette will be centered under screen 25 for exposure. As this selection is made, shaft 111 is rotated to index cams 110 and 210, and their followers 105 and 212 respectively set up the carriage and tray controls by (a) locking rack slide 85 so as to diminish the advancing motion of arm 35 and (b) moving arm 215 clockwise about its pivot 216 to align notch 218 for receiving latch 220 as soon as the carriage begins to advance. As he makes his selection, the operator sees in window 196 an indication of the portion of the cassette he is about to expose, since the position of the markings on dial member 194 as viewed through the window is the same relative to the operator as that portion of the cassette which will be centered above the X-ray source.

Now the operator observes the fluoroscopic screen 25 and continues his examination until he discovers a particular condition which he wishes to record for further study. He then presses and holds down button 305, thus completing the advancing circuit for motor 50 and driving the pinion 55 to cause rack 60 to rotate gear 65, and thence through shaft 67 to rotate arm 35 in a counterclockwise direction. Since rack slide 85 is locked, gear 77 will be forced to travel along rack insert 83 in the opposite direction from the advancing carriage. As soon as the carriage 32 has left its home or retracted position, pawl 186 locks the shaft 111 against any further movement, latch 220 enters the selected notch 218, and switches 320 and 321 are closed.

The carriage 32 continues to advance toward its exposure position in registry with screen 25, and as roller 227 engages the guiding surface 232, roller 250 will be urged into lower portion 248 of guideway 245, with resultant entry of follower 212 into lower guideway 252 and movement of the tray 30 transversely across carriage 32 toward the bottom of that carriage as viewed in Fig. 3a. The continued rotation of arm 35 moves the carriage to the position where the slide 70 has moved through its complete range of travel to the right of Fig. 3b, away from the advancing carriage, and thus diminished the normal reach of arm 35 (i. e. the reach of that arm if its pivot point has not been moved) by an amount equal to such travel of the slide. The resulting compound movements of the tray and carriage will, in this example, center the upper left corner of the cassette beneath the center point 25' of screen 25, corresponding to the first in the series of diagrammatic examples in Fig. 22.

The operator holds the cassette in this position for the interval necessary to complete the exposure as already described, and then releases push button 305 to initiate the return movement of carriage 32. As the carriage approaches its retracted position, the indexing mechanism is released by unlocking pawl 186 when stop 190 contacts pin 191. Also, during the retracting motion, slotted wheel 135 has been building up indexing energy by expanding spring 155, and now upon release of pawl 186, the indexing action occurs, just as the carriage comes to a halt in its retracted position. The indexing mechanism moves ratchet wheel 125 through one-thirteenth of a revolution to set the cams 110 and 210 for the next picture in the sequence, and the dial member 194 is automatically rotated clockwise until the small square accompanied by numeral "2" appears under window 196, which setting corresponds to the second of the schematic examples of Fig. 22. The tunnel mechanism is immediately ready for further use, requiring only that the operator again press and hold down button 305 to begin the above sequence anew.

The operation of the tunnel for taking the second, third and fourth of this sequence of radiographs is the same as described in connection with the first quarter of the cassette, with the necessary indexing for both the carriage and the tray taking place automatically each time as the carriage reaches its fully retracted position. When the full set of four pictures has been completed, however, the motor control cam 270 reaches an angular position such as to actuate its follower 275 and thereby to open the switch 280. This opens the motor circuit so that if the operator should again press the push button 305, no action will take place, and he will thus realize that the cassette has been fully exposed and must be replaced. The operation of the tunnel for making radiographs in any of the other sequences illustrated by Figs. 19–21 is essentially the same, and for each such sequence, the motor control cam 270 will operate automatically when the cassette is fully exposed to prevent accidental double exposures. It should also be noted that the controls of the invention make it impossible for the indexing mechanism to be changed while the tunnel is away from its retracted position, since it is only when the tunnel is fully retracted that the locking pawl 186 for the star wheel 180 is released to permit indexing.

In all of these working movements of the carriage, the natural operation of the drive system for the carriage provides a rapid overall movement while at the same time controlling acceleration and deceleration of the carriage in such manner that smooth operation is established without special shock absorbing means. More particularly, the delivery stroke of the control arm 35 extends through approximately 180° from a position extending rearwardly of the tunnel to a position extending forwardly of the tunnel. As a result, the major portion of the actual forward movement of the carriage takes place during the middle portion of the stroke of the arm 35, namely while the path of the roller 36 most closely approaches movement lengthwise of the tunnel. Then during the last portion of the arm stroke, the path of the roller 36 more closely approaches a direction extending transversely of the tunnel, and the actual forward movement of the carriage is naturally decelerated until it stops when the roller 36 reaches its foremost point of advance with respect to the tunnel. Thus the movement of the carriage approaches harmonic motion, with a relatively slow beginning, a rapid middle portion, and a decelerating last portion, so that the carriage arrives at its exposure position with minimum shock and is therefore substantially immediately ready for exposure.

It will accordingly be seen that the spot film tunnel provided by this invention will speedily and precisely locate the cassette in the exact position desired by the operator, as is important when making examinations and radiographs of a patient who may be uncomfortable and unable to remain in a fixed position for a prolonged time. The visual dial control affords a ready check on the exact portion of the cassette which is to be exposed, and the indexing mechanism, together with its associated double exposure switch, rapidly actuates the carriage and tray control mechanisms to allow a quick series of radiographs to be made, yet prevents this mechanism from accidentally exposing the same portion of the cassette more than once, and in breaking the motor control circuit and advancing a blank space on the dial into position below the control dial window, informs the operator that the entire cassette has been exposed.

The tray counterbalancing system allows the tunnel to be used in any horizontal or vertical position, or at any angle between horizontal and vertical, without placing unusual stresses on the guideways for the tray or the rollers which are received in these guideways, thus preventing such stresses from interfering with the quick positioning of the cassette at its advanced station upon the call of the operator. It will also be noted, particularly in Figs. 1 and 5, how compact the tunnel is and also how free of bulky projections. Thus the forward portion of the tunnel is relatively thin to provide ample room for the patient between the bottom of the tunnel and the table top, while the rearward portion is slanted downwardly along the bottom to provide more housing space for the drive and associated parts. At the same time, the structure on the tunnel top is kept to such proportions that the tunnel can easily be shifted through approximately 90° upward into substantial parallelism with the tower when it is not to be used.

While the form of apparatus herein described constitutes a preferred embodiment of the invention, it is to be understood that the invention is not limited to this precise form of apparatus, and that changes may be made therein without departing from the scope of the invention which is defined in the appended claims.

What is claimed is:

1. In an X-ray spot film tunnel of the character described, the combination of a tunnel base, a track extended longitudinally of said base, a carriage movable along said track between a retracted position and a plurality of advanced positions, means including a delivery arm for effecting said movement of said carriage, means forming a pivotal mounting on said base for one end of said arm, means connecting the other end of said arm with said carriage, drive means for pivoting said arm on said mounting to advance and retract said carriage, and means for selectively shifting said mounting longitudinally of said base to vary the extent of advancing movement of said carriage.

2. In an X-ray spot film tunnel of the character described, the combination of a tunnel base, a track extended longitudinally of said base, a carriage movable along said track between a retracted position and a plurality of advanced positions, means including a delivery arm for effecting said movement of said carriage, means forming a pivotal mounting on said base for one end of said arm, means connecting the other end of said arm with said carriage, drive means for pivoting said arm on said mounting to advance and retract said carriage, and means operated selectively by said drive means simultaneously with said pivoting movement of said arm for shifting said mounting longitudinally of said base to vary the extent of advancing movement of said carriage.

3. In an X-ray spot film tunnel of the character described, the combination of a tunnel base, a track extended longitudinally of said base, a carriage movable along said track between a retracted position to a plurality of advanced positions, means including a delivery arm for effecting said movement of said carriage, means forming a pivotal mounting on said base for one end of said arm, means connecting the other end of said arm with said carriage, drive means for pivoting said arm on said mounting to advance and retract said carriage, means forming a movable support for said pivotal mounting, control means for holding said support stationary during operation of said drive means to establish a first advanced position of said carriage, and means selectively operable alternatively with said control means for causing said support to shift lengthwise of said tunnel in the same as or the opposite direction from said carriage to establish advanced positions of said carriage correspondingly on either side of said first advanced position.

4. In an X-ray spot film tunnel of the character described, the combination of a tunnel base, a track extended longitudinally of said base, a carriage movable along said track between a retracted position and a plurality of advanced positions, means including a delivery arm for effecting said movement of said carriage, means forming a pivotal mounting on said base for one end of said arm, means connecting the other end of said arm with said carriage, drive means for pivoting said arm on said mounting to advance and retract said carriage, and means for selectively shifting said arm with respect to said base in addition to said pivoting of said arm to establish said plurality of advanced positions of said carriage by varying the extent of advancing movement thereof.

5. In X-ray apparatus of the character described including a carriage movable on a base between a retracted position and a plurality of advanced positions, the combination of drive means for selectively advancing said carriage to said advanced positions comprising an arm having a pivotal mounting at one end thereof and having the other end thereof operatively connected to said carriage, means for rotating said arm about said mounting to move said carriage, a rack pinion coaxial with said mounting, a pair of racks engaging opposite sides of said pinion and supported for linear movement on said base, selectively operable means for locking either of said racks with respect to said base during pivoting movement of said arm to cause said rack pinion and the other said rack to travel linearly on said base with resulting net increase or decrease in the driving movement of said arm for travel of said carriage, and means establishing a neutral position for said locking means wherein both of said racks are unlocked to cause said pivotal mounting to remain stationary during pivoting of said arm.

6. In X-ray apparatus of the character described including a carriage movable on a base between a retracted position and a plurality of advanced positions, the combination of drive means for selectively advancing said carriage to said advanced positions comprising an arm having a pivotal mounting at one end thereof and having the other end thereof operatively connected to said carriage, means for rotating said arm about said mounting to move said carriage, a rack pinion coaxial with said mounting, a pair of racks engaging opposite sides of said pinion and supported for linear movement on said base, selectively operable means for locking either of said racks with respect to said base during pivoting movement of said arm to cause said rack pinion and the other said rack to travel linearly on said base with resulting net increase or decrease in the driving movement of said arm for travel of said carriage, means establishing a neutral position for said locking means wherein both of said racks are unlocked to cause said pivotal mounting to remain stationary during pivoting of said arm, and means coordinated with said last named means for positively holding said mounting stationary in said neutral position of said locking means.

7. In a spot film tunnel having a generally rectangular housing and a fluorescent screen at one end thereof adapted to be aligned with a source of X-rays for fluoroscopic examinations, the combination of a carriage adapted to receive a cassette containing X-ray sensitive material for making radiographs, means for moving said carriage from a retracted position to a plurality of advanced positions relative to the source of X-rays including an arm operatively connected at one of its ends to said carriage, means providing a pivotal mounting for the other end of said arm, a shaft connected to said other end of said arm and extending through said mounting, a gear attached to said shaft, drive means for said gear including a driving rack adapted to rotate said gear, a rack pinion coaxial with said shaft and secured thereto, a pair of additional racks in mesh with said rack pinion on opposite sides thereof, means supporting said additional racks for sliding movement in the same direction as said mounting, means for selectively locking one or the other of said additional racks relative to said housing to translate rotative movement of said pinion into concurrent linear movement of said mounting relative to said carriage to augment or diminish the reach of said arm, means establishing a neutral position of said locking means wherein both said additional racks are unlocked, means for holding said mounting stationary in said neutral position of said locking means, and means for maintaining said driving rack in mesh with said gear during linear movement of said pivotal mounting.

8. In an X-ray spot film tunnel including a generally rectangular housing having a fluorescent screen at one end thereof, the combination of a cassette receiving carriage, means for moving said carriage longitudinally of said housing between advanced positions in registry with said screen and a retracted position away from said screen, said means including a reversible electric motor operatively connected to move said carriage, a control circuit for said motor, switching means in said control circuit for reversing said motor and resistance means selectively connected in said control circuit by said switching means for slowing said motor during movement of said carriage from an advanced position to the retracted position thereof.

9. In an X-ray spot film tunnel including a generally rectangular housing having a fluorescent screen at one end thereof, the combination of a carriage adapted to receive X-ray sensitive material, drive means including an electric motor for advancing said carriage longitudinally of said housing from a retracted position away from said screen to advanced exposure positions in registry with said screen, a control circuit for said motor, means for indexing said drive means to locate selected portions of said sensitive material for exposure at said advanced position of said carriage in predetermined sequence, a double exposure prevention switch in said control circuit adapted to break said control circuit, and means cooperating with said indexing means to operate said switch following exposure of all of said sensitive material.

10. In an X-ray spot film tunnel including a generally rectangular housing having a fluorescent screen at one end thereof, the combination of a carriage adapted to receive X-ray sensitive material, drive means for advancing said carriage longitudinally of said housing from a retracted position away from said screen to advanced exposure positions in registry with said screen, means for indexing said drive means to locate selected portions of said sensitive material for exposure at said advanced position of said carriage in predetermined sequence, and means cooperating with said indexing means to prevent operation of said drive means following exposure of all of said sensitive material and thereby to prevent double exposure thereof.

11. In a spot film tunnel including a carriage movable longitudinally of said tunnel and having a cassette tray mounted for transverse movement within said carriage relative to said tunnel, the combination of control means for shifting said tray in said carriage, means for counterbalancing said tray with respect to said carriage and including a counterweight mounted for movement on said tunnel, and means forming a movable connection from said counterweight to said carriage and said tray providing for movement of said tray and carriage with respect to said counterweight.

12. In a spot film tunnel including an elongated generally rectangular housing and a carriage movable longitudinally of said housing and having a cassette tray mounted for transverse movement therewithin relative to said housing, the combination of counterbalancing means for said tray including a counterweight supported for sliding movement across one end of said housing, a pulley mounted at each corner of said housing, a plurality of pulleys on said tray, a plurality of pulleys on said carriage, and cable means attached to opposite sides of said counterweight and operatively threaded about said pulleys to move said counterweight across said housing in a direction opposite to transverse movement of said tray while providing for said movements of said carriage and said tray with respect to said housing.

13. In an X-ray spot film tunnel including a carriage movable longitudinally of said tunnel and having a cassette receiving tray mounted for transverse movement within said carriage relative to said tunnel, the combination of control means for shifting said tray in said carriage transversely of said tunnel, and counterbalancing means operatively associated with said tray including a counterweight mounted for movement with respect to said carriage in response to transverse movement of said tray in such a direction as substantially to nullify the vertical force components acting on said tray during operation of said tunnel in tilted relation to the horizontal.

14. In an X-ray spot film tunnel of the character described, the combination of a tunnel base, a carriage movable longitudinally of said base between a retracted position and a plurality of advanced positions, a cassette receiving tray mounted for transverse movement in said carriage relative to said base, a control arm pivoted to said tray, a follower on said control arm spaced from the pivot thereof, a guide roller depending from said arm in spaced relation with said pivot, a plurality of guideways mounted on said base for selectively receiving said follower upon advancing movement of said carriage to move said tray across said carriage, an indexing shaft pivoted to said base adjacent the retracted position of said carriage, a tray control cam fixed to said shaft and adapted to contact said follower in said retracted position of said carriage to index said arm in accordance with the setting of said cam, locking means on said tray for retention of said arm relative to said tray, and means effective in said retracted position of said carriage for releasing said locking means to provide for setting of said follower by said cam.

15. In an X-ray spot film tunnel including a generally rectangular housing having a fluorescent screen at one end thereof and having a carriage movable longitudinally of said housing between a retracted position away from said screen and a plurality of advanced positions in registry with said screen, the combination of main drive means for moving said carriage, a cassette receiving tray mounted for transverse movement in said carriage relative to said base to a plurality of positions at each said advanced position of said carriage, an indexing shaft rotatably supported on said housing adjacent the retracted position of said carriage, a carriage control cam fixed to said shaft, a tray control cam fixed to said shaft, means operative in response to the setting of said cams for guiding said carriage and said tray into a selected said advanced position relative to said screen, means for locking said indexing shaft against rotation thereof during substantially the entire operation of said drive means, an indexing drive for said shaft including a spring, means operable during movement of said carriage from said advanced positions to said retracted position for stressing said spring to store energy therein and means operable in response to arrival of said carriage at said retracted position for releasing said locking means with resulting sudden driving of said indexing drive by the stored energy of said stressed spring.

16. In an X-ray spot film tunnel including a generally rectangular housing having a fluorescent screen at one end thereof, the combination of a cassette receiving carriage, means for moving said carriage longitudinally of said housing between advanced positions in registry with said screen and a retracted position away from said screen, said means including a reversible electric motor operatively connected to advance and retract said carriage, a normally closed switch on said tunnel arranged to be opened by said carriage in the retracted position thereof, a manually operable switch on said tunnel normally urged into a first position and adapted to be manually urged into a second position, a control circuit for said motor including said switches and arranged to provide for energization of said motor in a direction to advance said carriage upon movement of said manually operated switch to its said second position, said circuit including means for reversing said motor to retract said carriage upon movement of said manually operable switch to its said first position and during closing of said carriage operated switch, and variable resistance means operatively connected between said carriage operated switch and said second position of said manually operated switch to decrease the speed of said motor during retracting movement of said carriage.

References Cited in the file of this patent

UNITED STATES PATENTS

| | | |
|---|---|---|
| 2,327,603 | Kizaur | Aug. 24, 1943 |
| 2,504,687 | Hollstein | Apr. 18, 1950 |
| 2,552,858 | Mueller et al. | May 15, 1951 |
| 2,688,913 | Goldfield et al. | Feb. 9, 1954 |
| 2,749,445 | Stava et al. | June 5, 1956 |